United States Patent Office 3,700,566
Patented Oct. 24, 1972

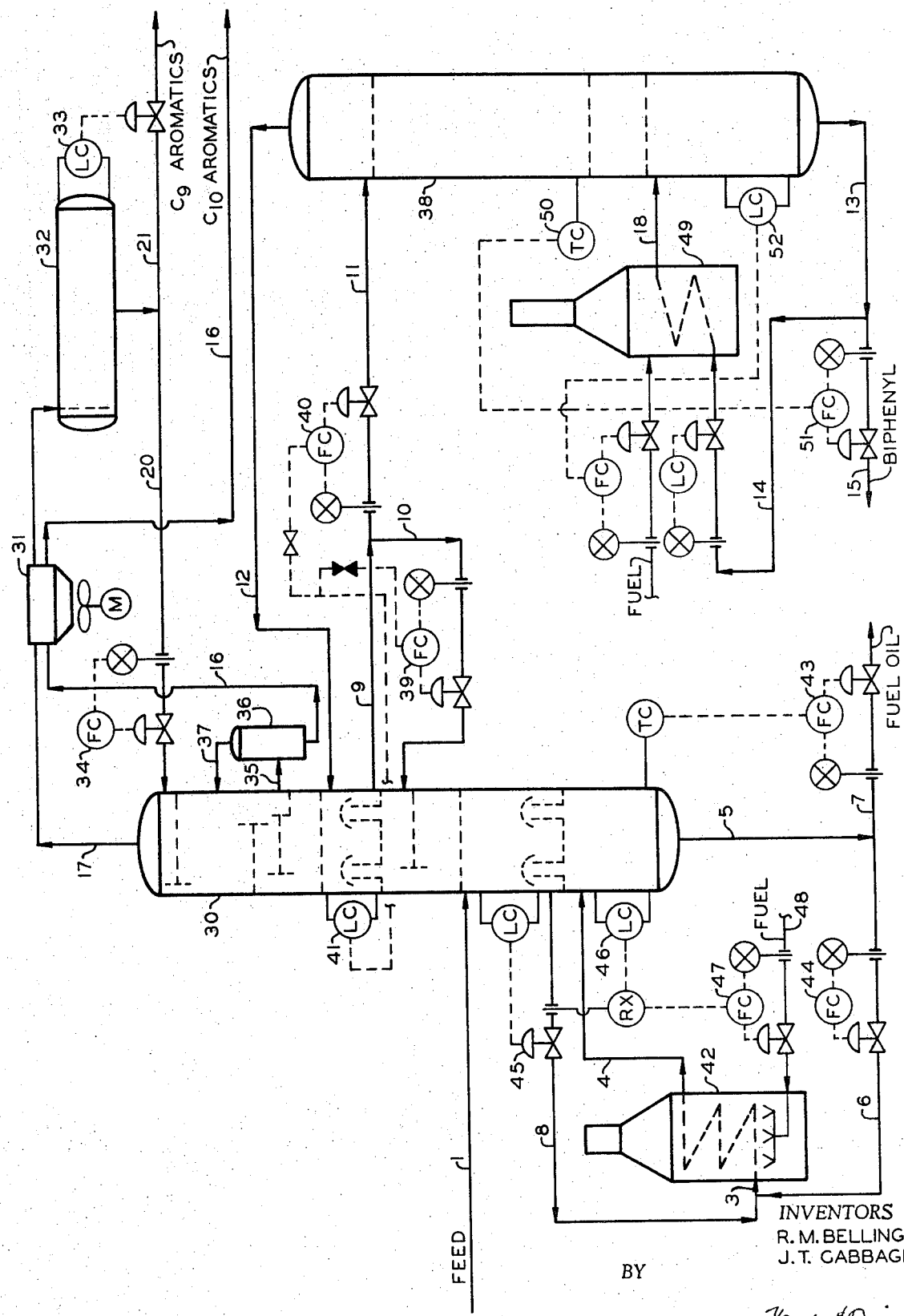

3,700,566
BIPHENYL PURIFICATION PROCESS BY PLURAL STAGE FRACTIONAL DISTILLATION
Robert M. Bellinger, Bartlesville, Okla., and John T. Cabbage, Guayama, Puerto Rico, assignors to Phillips Petroleum Company
Filed Oct. 13, 1969, Ser. No. 865,650
Int. Cl. C07c 7/04, 3/58
U.S. Cl. 203—1
4 Claims

ABSTRACT OF THE DISCLOSURE

A method is disclosed for recovering a biphenyl stream for recirculation to a hydrodealkylation process for producing benzene which involves fractionating the product stream after the removal of the benzene to produce a $C_9$ aromatics cut, a $C_{10}$ aromatics cut, a fuel oil cut and a biphenyl stream of about 88 percent purity.

---

This invention pertains to the production of benzene.

In one of its more specific aspects, this invention pertains to the production of benzene by the hydrodealkylation of toluene.

That process of producing benzene by the hydrodealkylation of toluene is well known. Generally, it involves contacting toluene with hydrogen under conditions which produce benzene in a stream from which it is recovered.

This latter stream, after the separation of benzene and lighter materials, toluene and xylenes, is processed to produce a $C_9$ and lighter cut, a $C_{10}$ aromatics cut, both suitable in color and other properties for direct blending into motor fuel, a residual fuel cut, and a biphenyl cut for recycling to benzene production. The method of this invention is directed to this latter processing.

According to this method there is provided a process for recovering a stream comprising biphenyl from a hydrodealkylation process effluent stream from which benzene and lighter materials, toluene and xylene have been removed, which comprises introducing said stream into a first fractionation zone, withdrawing from the fractionation zone at a point of highest biphenyl concentration, a biphenyl-containing stream, introducing this stream into a second fractionating zone from which there is separated an overhead stream which is introduced into the first fractionation zone and a bottoms stream comprising biphenyl.

Accordingly, it is an object of this invention to provide a process for recovering a suitable gasoline blending component from a hydrodealkylation process.

It is another object of this process to recover a biphenyl stream of optimum composition for recycling to a reaction zone of the hydrodealkylation process for the production of benzene.

The method of this invention will be more easily understood if explained in conjunction with the attached drawing which illustrates schematically one embodiment of this invention.

Referring now to the attached drawing, there is shown a feed stream being introduced through conduit 1 into fractionator 30.

Fractionator 30 comprises a tower containing a suitable number of trays. It is operated at a bottoms tower condition of about 522° F. and 10 p.s.i.g. and a top tower condition of about 358° F. and 6 p.s.i.g.

The overhead from the tower is removed through conduit 17 to overhead condenser 31, into accumulator 32. Reflux is introduced from accumulator 32 through conduit 20 into tower 30. From reflux accumulator 32 there is recovered through conduit 21 a $C_9$ cut suitable for blending in motor fuel. Flow through product conduit 21 is controlled by liquid level controller 33 on accumulator 32. The reflux rate to the tower through conduit 20 is controlled by flow controller 34.

From a trap tray of tower 30, there is withdrawn a stream through conduit 35 to separating drum 36. Overhead gases from the drum pass back into tower 30 through conduit 37 while a $C_{10}$ aromatic cut is withdrawn through conduit 16 to disposal, e.g., gasoline blending.

A second sidestream is withdrawn from the tower through conduit 9. One portion of this stream is reintroduced into tower 30 through conduit 10, and a second portion is transferred through conduit 11 to the after-discussed biphenyl stripper 38. One or the other of flow controllers 39 and 40, positioned in conduits 10 and 11 respectively, operate in conjunction with a liquid controller 41 on the draw-off tray to regulate the flow through one or the other of the conduits.

From the bottom of tower 30, there is circulated a stream through conduits 5 and 6 to reboiler 42. A second stream, withdrawn from a trap tray just above the reboiler section of the tower, passes through conduit 8, the two streams being combined and introduced into the reboiler through conduit 3 and leaving the reboiler and entering the tower through conduit 4. A portion of that stream withdrawn through conduit 5 is routed to fuel through conduit 7, liquid level controller 43 operating in conjunction with a temperature controller to regulate the amount so routed to fuel.

The quantity of flow through conduit 6 is controlled by flow controller 44 in conduit 6 and the amount of flow through conduit 8 is controlled by level controller 45 in relation to the level on the draw-off tray. The temperature of the reboiler effluent returned to the tower through conduit 4 is controlled by liquid level controller 46 operating in conjunction with proportional flow controller 47 in fuel gas conduit 48 to the reboiler, this flow controller valve being positioned in relation to the flow through conduit 8.

Quantities and analyses of the various streams concerned in the operation of fractionator 30 are shown in Table I.

TABLE I

|  | Feed | $C_9$ aromatics | $C_{10}$ aromatics | Biphenyl stripper feed | Reboiler feed | Fuel oil |
|---|---|---|---|---|---|---|
| Stream: | | | | | | |
| Conduit | 1 | 21 | 16 | 11 | 3 | 7 |
| Rate, b.p.h. | 125 | 66 | 33 | 35 | 220 | 6 |
| Components, b.p.d: | | | | | | |
| Orthoxylene | 48 | 42 | 6 | 2 | 53 | 0 |
| 1-methyl-3-ethylbenzene | 940 | 717 | 213 | 66 | 1,074 | 8 |
| 1,2,4-trimethylbenzene | 1,086 | 709 | 364 | 85 | 1,249 | 10 |
| 1,2,3-trimethylbenzene | 180 | 96 | 81 | 16 | 210 | 2 |
| 1,3-methyl-5-ethylbenzene | 72 | 14 | 56 | 9 | 87 | 1 |
| 1,2,3,5-methylbenzene | 72 | 1 | 66 | 20 | 93 | 1 |
| Napthalene | 11 | 0 | 4 | 12 | 16 | 0 |
| Biphenyl | 455 | 0 | 5 | 584 | 1,125 | 37 |
| 4-methylbiphenyl | 45 | 0 | 0 | 47 | 199 | 8 |
| Fluorene | 51 | 0 | 0 | 4 | 767 | 47 |
| Anthracene | 40 | 0 | 0 | 0 | 416 | 30 |
| Total | 3,000 | 1,579 | 795 | 845 | 5,289 | 154 |

Of that quantity of about 113 b.p.h. taken as a side cut from fractionator 30 through conduit 9, about 35 b.p.h. is introduced into biphenyl stripper 38, the balance being returned to fractionator 30 on the tray beneath the draw-off tray.

The biphenyl stripper is a tray-containing tower, the liquid charge through conduit 11 being introduced on the uppermost tray. The tower is operated at a bottoms tower condition of 540° F. at about 10 p.s.i.g.

From the bottoms of the biphenyl stripper, a stream is withdrawn through conduit 13, a portion being introduced through conduit 14 to reboiler 49 and back to stripper 38 by way of conduit 18, and a portion being recovered to a benzene producing process through conduit 15. The amount so routed to recovery is controlled by temperature controller 50 relating to flow controller 51 in conduit 15.

In conjunction therewith, liquid level controller 52, operating at the bottom of the tower, controls the fuel to reboiler 49, with the result that under stabilized operation, that quantity of material returned from the reboiler through conduit 18 to the tower is about 50 percent vaporized, the reboiler circulation rate being about 45 b.p.h.

An overhead stream from the biphenyl stripper 38 is taken through conduit 12 at the rate of about 16 b.p.h. This material is introduced into fractionator 30 above the stream drawn off through conduit 9 from the trap tray.

Stream analyses around the biphenyl stripper 38 are shown in Table II.

TABLE II

|  | Biphenyl stripper feed | Stripper overhead | Reboiler feed | Biphenyl product |
|---|---|---|---|---|
| Stream: |  |  |  |  |
| Conduit | 11 | 12 | 14 | 15 |
| Rate, b.p.h | 35 | 16 | 45 | 20 |
| Components, b.p.h.: |  |  |  |  |
| Orthoxylene | 2 | 2 | 0 | 0 |
| 1-methyl-3-ethylbenzene | 66 | 64 | 5 | 2 |
| 1,2,4-trimethylbenzene | 85 | 82 | 6 | 3 |
| 1,2,3-trimethylbenzene | 16 | 15 | 2 | 1 |
| 1,3-methyl-5-ethylbenzene | 9 | 8 | 2 | 1 |
| 1,2,3,5-methylbenzene | 20 | 16 | 8 | 4 |
| Naphthalene | 12 | 5 | 15 | 7 |
| Biphenyl | 584 | 171 | 954 | 413 |
| 4-methylbiphenyl | 47 | 10 | 85 | 37 |
| Fluorene | 4 | 0 | 10 | 4 |
| Anthracene | 0 | 0 | 0 | 0 |
| Total | 845 | 373 | 1,087 | 47 |

It will be seen from the above tables that approximately 91 percent of the biphenyl in the original stream is recovered in a stream of about 88 percent purity. It will be further seen that the $C_9$ aromatic fraction is substantially devoid of the aromatics of naphthalene and heavier while the $C_{10}$ aromatic fraction is essentially void of naphthalene and biphenyl. Furthermore, there is produced a minimal quantity of fuel oil.

It will be appreciated that various modifications can be made to the method of this invention in light of the above disclosure. Such, however, are considered as being within the scope of the invention.

What is claimed is:

1. A process for producing a biphenyl product from the hydrodealkylation unit effluent from which benzene and lighter materials and toluene and xylene have been substantially removed, said effluent comprising $C_9$ aromatics, fuel oil, $C_{10}$ aromatics and biphenyl, which comprises:

(a) introducing said effluent and an after-defined overhead stream into a first fractionation zone;

(b) removing from said first fractionation zone an overhead fraction comprising substantially $C_9$ aromatics, a bottoms fraction comprising substantially fuel oil, a first upper side stream comprising $C_{10}$ aromatics and a second lower side stream comprising biphenyl;

(c) introducing said second lower side stream into a second fractionation zone;

(d) recovering from said second fractionation zone an overhead stream and a bottoms fraction comprising biphenyl;

(e) introducing into said first fractionation zone said overhead stream from said second fractionation zone in accordance with step (a); and, (f) withdrawing at least a first stream from said first fractionation zone, dividing the fuel oil bottoms fraction into two portions, one of said portions constituting a second stream passing said first and second streams through a reboiler and into said first fractionation zone, the first stream being withdrawn from a trap tray positioned above the lower extremity of said first fractionation zone and the second stream being withdrawn from substantially the lower extremity of said first fractionation zone, the rate at which said first stream is withdrawn being controlled by a liquid level on said trap tray.

2. The method of claim 1 in which said reboiler is fired with fuel gas and the rate of said fuel gas to said reboiler is controlled by the rate of withdrawal of said first stream from said trap tray.

3. The method of claim 2 in which the other portion of said two portions is removed as a fuel oil product stream.

4. The method of claim 3 in which the rate at which said fuel oil product stream is removed is controlled by the temperature in the lower extremity of said first fractionation zone.

References Cited

UNITED STATES PATENTS

| 3,210,271 | 10/1965 | Byerly et al. | 203—82 |
| 3,297,566 | 1/1967 | Moyer et al. | 203—82 |
| 3,309,288 | 3/1967 | Butterbaugh | 203—2 |
| 3,330,741 | 7/1967 | Therleg et al. | 203—84 |
| 3,402,124 | 9/1968 | Jones | 203—84 |
| 3,435,084 | 3/1969 | Cabbage et al. | 260—672 |
| 3,494,861 | 2/1970 | Munro | 203—82 |
| 3,310,594 | 3/1967 | Peterson et al. | 260—672 |
| 3,296,323 | 1/1967 | Myers et al. | 260—672 |
| 3,069,483 | 12/1962 | Bauer | 260—683.48 |
| 3,201,488 | 8/1965 | Sherk et al. | 260—672 |
| 3,223,745 | 12/1965 | Davison | 260—672 |

OTHER REFERENCES

Fowle & Pitts, "Thermal Hydrodealkylation," Chem. Eng. Progress, vol. 58, pp. 37–40 (April 1962).

WILBUR L. BASCOMB, JR., Primary Examiner

U.S. Cl. X.R.

203—2, 84, 99, 100, DIG. 18; 260—672 NC, 674 R; 202—206